2,912,410

PROCESS OF PREPARING A CURED BLEND OF FORM - STABLE, CROSS - LINKED POLYETHYLENE AND POLYBUTADIENE AND COMPOSITIONS THEREOF

Quinton P. Cole, Pittsfield, Mass., assignor to General Electric Company, a corporation of New York No Drawing. Application January 27, 1956
Serial No. 561,938

6 Claims. (Cl. 260—45.5)

This invention relates to curable compositions comprising blends of (1) polyethylene which is form-stable at least at 200° C. and (2) polymerized butadiene-1,3 (hereinafter referred to as "polybutadiene"), and heat-cured compositions thereof having improved cut-through resistance, particularly at elevated temperatures.

Polyethylene has proved to be one of the most popular polymeric materials to be evolved in recent years. Thus, polyethylene has found wide usage as an insulating material, as a container material, as a conduit material, etc. Fabrication, molding, extrusion and calendering of polyethylene are readily accomplished by standard methods, thus facilitating its use for many purposes. In recent years, many methods have been devised for rendering polyethylene substantially infusible and insoluble by treatment with high energy radiation, for instance, high energy electrons as is more particularly disclosed and claimed in Lawton and Bueche patent application, Serial No. 324,552, filed December 6, 1952, and assigned to the same assignee as the present invention. Polyethylene has also been rendered form-stable and substantially infusible and insoluble by means of organic peroxides which are incorporated therein and which effect curing or vulcanization of polyethylene upon application of heat. However, even in such circumstances, polyethylene exhibits poor resistance to deformation under load at elevated temperatures and this defect of inadequate resistance to deformation under load exhibits itself when the polyethylene is employed as insulation on electrical wires.

Unexpectedly, I have discovered that polyethylene which is form-stable at 200° C. can be rendered more resistant to cut through and deformation under load at elevated temperatures than has heretofore been possible even when employing cross-linked polyethylene, for instance, by irradiation, by chemical means, etc., by blending the form-stable polyethylene with amounts of a polymerized butadiene-1,3 in such proportions that the latter comprises from 5 to 40% of the total weight of the two aforementioned ingredients, and thereafter heating the mixture of ingredients at temperatures above 200° C. (e.g., from 225° to 400° C. or higher) for a time sufficient to effect cure of the mixture of ingredients without the use of chemical organic peroxides. Cured blends of this type have the added advantage over the curing with organic peroxides of each of the individuals separately or in combination in that the electrical properties obtained by the heat treatment is better due to the fact that chemical agents are not used to cure or cross-link the blend.

Although it was known previously that polybutadiene could be heated at elevated temperatures to effect a cure thereof, it was entirely unexpected and in no way could have been predicted that the presence of even small amounts of the polybutadiene in the form-stable polyethylene would improve the deformation under load at elevated temperatures of the polyethylene composition.

The term "form-stable" as employed herein and in the appended claims is intended to include and mean polyethylene which will not flow at temperatures as high as 200° C. This resistance to flow in an unsupported condition at 200° C. is essential if one is to obtain the advantages of the blend of the form-stable polyethylene with the polybutadiene. Although it may be possible to employ the polybutadiene combination with the polyethylene in which the latter is not in a form-stable condition, by employing a mold which has sufficient resistance to flow of the polyethylene, nevertheless this invention is directed to more important applications in which it may not be possible to have molds which prevent flow of the non-form-stable polyethylene, for instance, in curing insulation on electrical conductors. Accordingly, the scope of this invention is specifically intended to include only polyethylene which has been rendered form-stable at temperatures of at least 200° C. prior to mixing with the polybutadiene.

The form stability of polyethylene may be obtained by incorporating in the polyethylene finely divided fillers such as silica aerogel, fume silica, carbon black, calcium silicate, etc., in amounts ranging from about 10 to 50% or more, by weight, based on the weight of the polyethylene. Partial cross-linking to obtain acceptable form stability at the minimum 200° C. level may also be obtained by effecting cross-linking of the polyethylene with either irradiation with high energy electrons such as that obtained by the process described in the aforementioned Lawton and Bueche application or by the use of chemical cross-linking agents such as organic peroxides, for instance, benzoyl peroxide, tertiary butyl perbenzoate, etc. Additional organic peroxides which may be employed are disclosed in the copending application of Precopio et al., Serial No. 509,388, filed May 18, 1955, and assigned to the same assignee as the present invention in which other peroxides have been found capable of curing polyethylene, for instance, di-alpha-cumyl peroxide. When employing high energy electrons for irradiating the polyethylene to effect satisfactory form stability, one may employ energy doses ranging from $3 \times 10^6$ R. to about $5 \times 10^8$ R. The use of irradiated and milled polyethylene or chemically cured and milled polyethylene as described in Cole application, Serial No. 437,477, filed June 17, 1954, and in Cole application, Serial No. 561,937 filed concurrently herewith, is not precluded for use with the polybutadiene.

The invention is advantageously carried out by milling the polybutadiene and the form-stable polyethylene on differential rubber rolls (which can advantageously be heated to about 100° to 150° C. if desired), and thereafter heating the mixture of ingredients either within or without a mold at temperatures above 200° C., preferably at temperatures of about 250° to 400° C. for times ranging from a few seconds, e.g., about 15 seconds to about 2 hours or more, depending upon the state of cure desired in the final product. In general, the time and temperature of cure should be sufficient to give the desired cure of the mixture of the polybutadiene and the form-stable polyethylene. The heating is advantageously carried out in a non-oxidizing inert atmosphere such as in the presence of nitrogen, helium, argon, etc.

The polyethylene referred to herein is a polymeric material formed, e.g., by the high or low pressure polymerization of ethylene. A form of polyethylene which can be employed is described in U.S. Patent 2,153,553, Fawcett et al., and in Modern Plastics Encyclopedia, New York, 1949, pages 268–271. Specific examples of commercially available polyethylene are the polyethylene sold by E. I. du Pont de Nemours & Co., Inc., Wilmington, Delaware, examples of which are Alathons 1, 3, 10, 12, 14, etc., those sold by the Bakelite Company, such as "DE–2400, DYNH, etc.," and the more crystalline forms of polyethylene such as Marlex 50 sold by Phillips Petroleum Company, etc. An excellent discussion of low pressure polyethylene within the scope of this invention is found in Modern Plastics, vol. 33, #1 (September 1955), commencing on page 85.

One polybutadiene which can be used within the scope of this invention is a polymer having at least 30 percent of 1,2-polybutadiene (hereafter defined), the remainder comprising substantially 1,4-polybutadiene (hereafter defined). Since polybutadiene containing large amounts of "dangling vinyl groups" (1,2-polybutadiene) cures more readily than polybutadiene containing the double bond "buried" in the chain of the 1,4-polybutadiene, a polymer having large percentages of the 1,2-type is desired. Thus, the polymer containing 50-100% of 1,2-polybutadiene is preferred.

1,3-butadiene can enter into a polymer chain by either a 1,2- or 1,4-mode of addition; the 1,2-mode of addition results in the following structure:

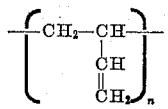

(hereafter called "1,2-polybutadiene") whereas the 1,4-mode of addition results in the following polymer structure:

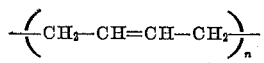

(hereafter called "1,4-polybutadiene"). Two types of catalysts are generally used to polymerize 1,3-butadiene, namely, the free-radical and the alkali-metal type catalyst. When 1,3-butadiene is polymerized by free radical-type catalysts such as peroxides, persulfates, etc., a higher proportion of 1,4-polybutadiene results as compared to the alkali-metal type catalyst wherein a higher proportion of 1,2-polybutadiene is obtained.

Among the catalysts which have been used are the alkali metals and compounds containing alkali metals. Thus, metals such as sodium, potassium, rubidium, cesium, sodium-potassium alloys, and compounds of these metals, such as phenyl isopropyl potassium, triphenyl methyl sodium, lithium butyl, amyl sodium and the like compounds have been used to effect such polymerization.

Whereas free-radical catalysts tend to produce larger amounts of 1,4-polybutadiene, catalysts of the alkali-metal type tend to increase the ratio of 1,2-polybutadiene. However, temperature as well as catalysts affects the type of polymer formed. For example, polybutadiene produced by polymerizing 1,3-butadiene with sodium at 110° C. contains about 15% of the 1,2-polybutadiene whereas 100% of 1,2-type polymer is produced when 1,3-butadiene is polymerized with sodium at −70° C. Although the ratio of the 1,2- to the 1,4-polybutadiene can be determined by ozonization, probably the more accurate method of determining this ratio is by the use of infrared spectra. Infrared curves identifying the different types of polymers are found in Dogadkin et al., Rubber Chemistry and Technology, 24, 591–596 (1951), Hampton, Anal. Chem. 21, 923–926 (1949) and Meyer, Ind. Eng. Chem. 41, 1570–1577 (1949). An excellent description of polybutadiene polymers is found in Whitby, Synthetic Rubber, pp. 734–757, Wiley and Sons, N.Y. (1954) wherein are described methods of preparing polybutadiene falling within the scope of this invention.

Since molecular weight is related to viscosity, viscosity measurements are a convenient method of expressing molecular weight. Although polybutadiene gums of a broad intrinsic viscosity range can be employed, we advantageously have employed polybutadiene having an intrinsic viscosity of 1 to 8 or higher. Optimum properties are obtained using polybutadiene having an intrinsic viscosity of 3.0 to 6.0.

Inherent viscosity is determined by a viscometer such as an Ostwald viscometer on a 0.25 percent solution of polybutane in benzene. This value is calculated as the natural logarithm of the ratio of flow time of the solution to the flow time of the solvent divided by the contration in grams/100 ml. Intrinsic viscosity $[\eta]$ is obtained by extrapolating the inherent viscosity v. concentration curve to zero concentration.

Another type of polybutadiene which may be employed in the practice of the present invention is a liquid polybutadiene which is also a highly unsaturated polymer with a molecular weight of approximately 1300, viscosity of 2500 centipoises at 100° F. and a specific gravity of 0.91. This polybutadiene has about 80% of the theoretical double bonds and is believed to have cycloolefinic rings in the polymeric structure, in addition to conjugated unsaturated and high content of vinyl groups, imparting to said liquid butadiene exceptional reactivity. This polybutadiene is manufactured by Phillips Petroleum Company as a result of the polymerization of butadiene with sodium catalysts.

In order that those skilled in the art may better understand how the present invention may be practiced, the following examples are given by way of illustration and not by way of limitation. All parts are by weight.

EXAMPLE 1

Polyethylene film (Bakelite DE-2400 of molecular weight 21,000) was irradiated with high energy electrons to a dose level of $7 \times 10^6$ R. 225 parts of the irradiated polyethylene were added on a two-roll mill with 25 parts of the liquid Phillips polybutadiene described above, while the mill was at a temperature of about 125° C. The mixture of ingredients thus obtained was extruded over #16 AWG bare copper wire to give a smooth coating. Sections of the coated wire were cured in the absence of air at a temperature of 260° C. for varying lengths of time, ranging from 1 hour to 7 hours. In each instance, the baked coatings thus obtained were glossy and much more resistant to scoring with a sharp point than was the untreated polyethylene. Improved resistance to cut through at high temperatures also characterized these examples as evidenced by the data presented in the following Table I. The test in general was conducted by placing a sample of the charged insulated wire over an aluminum heating block maintained at a temperature of 125° C. 0.033" steel music wire was placed crosswise over the insulation on the sample and a weight was attached to one end of the wire (the other end of the wire being fixed) so as to exert a cutting force on the insulation. This weight could be varied so that greater loads could be placed on the insulation of the insulated conductor. If the wire cuts through the insulation, it makes electrical contact with the charged conductor core indicating failure of the insulation.

*Table 1*

| Test Load (Grams) | Resistance to Cut-through for 300 Seconds at 125° C. | | | |
|---|---|---|---|---|
| | Base Resin [1] | Base Resin+10% Polybutadiene | | |
| | | Cured 1 hr./ 260° C. | Cured 3 hrs. 260° C. | Cured 7 hrs. 260° C. |
| 11 | OK | OK | OK | OK. |
| 30 | Failed | OK | OK | OK. |
| 50 | Failed | Failed | OK | OK. |
| 75 | | Failed | Failed | OK. |

[1] The term "base resin" is used to mean the polyethylene resin alone which had been irradiated and milled.

From the above results, it will be seen that after 7 hours of heating at 260° C. (the baking temperature of the insulation on the conductor), the wire coating contained the polybutadiene supported about 7 times the maximum load that the base polyethylene resin (without any polybutadiene) could support without cutting through.

It will, of course, be apparent to those skilled in the art that in addition to the polyethylene employed in the foregoing examples, other types of polyethylene, as well as other types of polybutadiene, including solid polybutadiene, may be used without departing from the scope of the invention. Also, it is apparent that varying proportions of the polybutadiene may be employed with the form-stable polyethylene within the scope of the invention.

Blends of the form-stable polyethylene and the polybutadiene can be used for various applications including insulation of electrical conductors, piping, tubing, floor and wall tile, molded gears and bearings, and, in general, can be used in articles (such as washing machine agitators, dishwasher impellers, etc.) which require high temperature strength and hardness at elevated temperatures and suitable hardness at ordinary temperatures.

What I claim as new and desire to secure by Letters Patent of the United States is:

1. The process for improving the resistance to cut-through at elevated temperatures of cross-linked polyethylene which comprises incorporating in the polyethylene which is in a form-stable state and will not flow in an unsupported state when measured at 200° C., fluid, polymerized butadiene-1,3 of from 3.0 to 6.0 intrinsic viscosity in an amount equal to from 5 to 40%, by weight, of the total weight of the latter and the polyethylene, and thereafter heating the mixture of ingredients in the absence of a curing agent for the polymerized butadiene and polyethylene at a temperature of from 250° to 400° C. for from 15 seconds to 7 hours.

2. The process as in claim 1 in which the heating of the mixture of the polyethylene and the polybutadiene takes place in an inert atmosphere.

3. A curable composition comprising cross-linked polyethylene which is form stable and will not flow in an unsupported state at a temperature of at least 200° C. and fluid polybutadiene having an intrinsic viscosity of from 3.0 to 6.0 in which the polybutadiene comprises, by weight, from 5 to 40% of the total weight of the cross-linked polyethylene and the polybutadiene.

4. A cured product of claim 3 in which the curing is carried out in the absence of any curing agent for either the polyethylene or polybutadiene but is carried out at a temperature of from 250° to 400° C. for from 15 seconds to 7 hours.

5. The composition of matter obtained by heating at a temperature from 250° C. to 400° C. for from 15 seconds to 7 hours a mixture of ingredients comprising cross-linked polyethylene which is form-stable and will not flow in an unsupported state at a temperature of at least 200° C. and fluid polybutadiene having an intrinsic viscosity of from 3.0 to 6.0, in which the polybutadiene comprises, by weight, from 5 to 40% of the total weight of the latter of the polyethylene, the said heating being carried out in the absence of a curing agent for either the polyethylene or polybutadiene.

6. The cured product as in claim 5 in which the heating is carried out in an inert atmosphere.

References Cited in the file of this patent

UNITED STATES PATENTS

| | | |
|---|---|---|
| 2,569,541 | Silby | Oct. 2, 1951 |
| 2,597,741 | Macey | May 20, 1952 |
| 2,628,214 | Pinkney et al. | Feb. 10, 1953 |
| 2,631,954 | Bright | Mar. 17, 1953 |